United States Patent
Mensah-Brown et al.

(10) Patent No.: US 9,796,288 B2
(45) Date of Patent: Oct. 24, 2017

(54) BUS PRE-CHARGE WITH VEHICLE POWER CONVERTER

(71) Applicant: Ford Global Technologies LLC, Dearborn, MI (US)

(72) Inventors: Arnold Kweku Mensah-Brown, Canton, MI (US); Allan Roy Gale, Livonia, MI (US); Bruce Carvell Blakemore, Plymouth, MI (US); Chih-Lun Wang, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 427 days.

(21) Appl. No.: 14/527,820

(22) Filed: Oct. 30, 2014

(65) Prior Publication Data

US 2016/0121749 A1  May 5, 2016

(51) Int. Cl.
   *B60L 11/18* (2006.01)
   *H02J 7/34* (2006.01)
   *H02M 3/335* (2006.01)

(52) U.S. Cl.
   CPC ....... *B60L 11/1853* (2013.01); *B60L 11/1805* (2013.01); *B60L 11/1868* (2013.01); *H02J 7/34* (2013.01); *B60L 2210/10* (2013.01); *H02M 3/33584* (2013.01); *Y02T 10/7005* (2013.01); *Y02T 10/7066* (2013.01); *Y02T 10/7077* (2013.01); *Y02T 10/7216* (2013.01)

(58) Field of Classification Search
   CPC ............. B60L 11/1851; B60L 11/1853; B60L 11/1868; B60L 2210/10; H02M 3/33584; Y02T 10/6213; Y02T 10/6221; Y02T 10/7005; Y02T 10/7066; Y02T 10/7216; H02J 2001/008; H02J 7/34
   See application file for complete search history.

(56) References Cited

U.S. PATENT DOCUMENTS

| | | | | |
|---|---|---|---|---|
| 6,828,742 B2 * | 12/2004 | Suzuki | ........... | B60K 6/485 |
| | | | | 180/65.26 |
| 8,203,810 B2 | 6/2012 | Bryan et al. | | |
| 2003/0029654 A1 * | 2/2003 | Shimane | ........... | B60K 6/28 |
| | | | | 180/65.29 |
| 2012/0187906 A1 * | 7/2012 | Martienssen | ........ | H01G 9/038 |
| | | | | 320/109 |
| 2016/0023559 A1 * | 1/2016 | Cho | ............. | B60L 11/18 |
| | | | | 318/139 |

FOREIGN PATENT DOCUMENTS

| | | |
|---|---|---|
| DE | 10235431 A1 | 2/2004 |
| WO | 2006093647 A1 | 9/2006 |

* cited by examiner

*Primary Examiner* — Ryan Johnson
(74) *Attorney, Agent, or Firm* — David B. Kelley; Brooks Kushman P.C.

(57) ABSTRACT

A vehicle includes an electric machine, a traction battery to power the electric machine, and a starting, lighting and ignition (SLI) battery. The vehicle also includes a galvanically isolated DC-DC converter connecting the batteries and having a bus capacitance in parallel therewith. The vehicle further includes a contactor to electrically connect the traction battery in parallel with the bus capacitance, and a controller. The controller, in response to a command to close the contactor, activates switches of the DC-DC converter to drive energy from the SLI battery to the bus capacitance before closing the contactor.

9 Claims, 1 Drawing Sheet

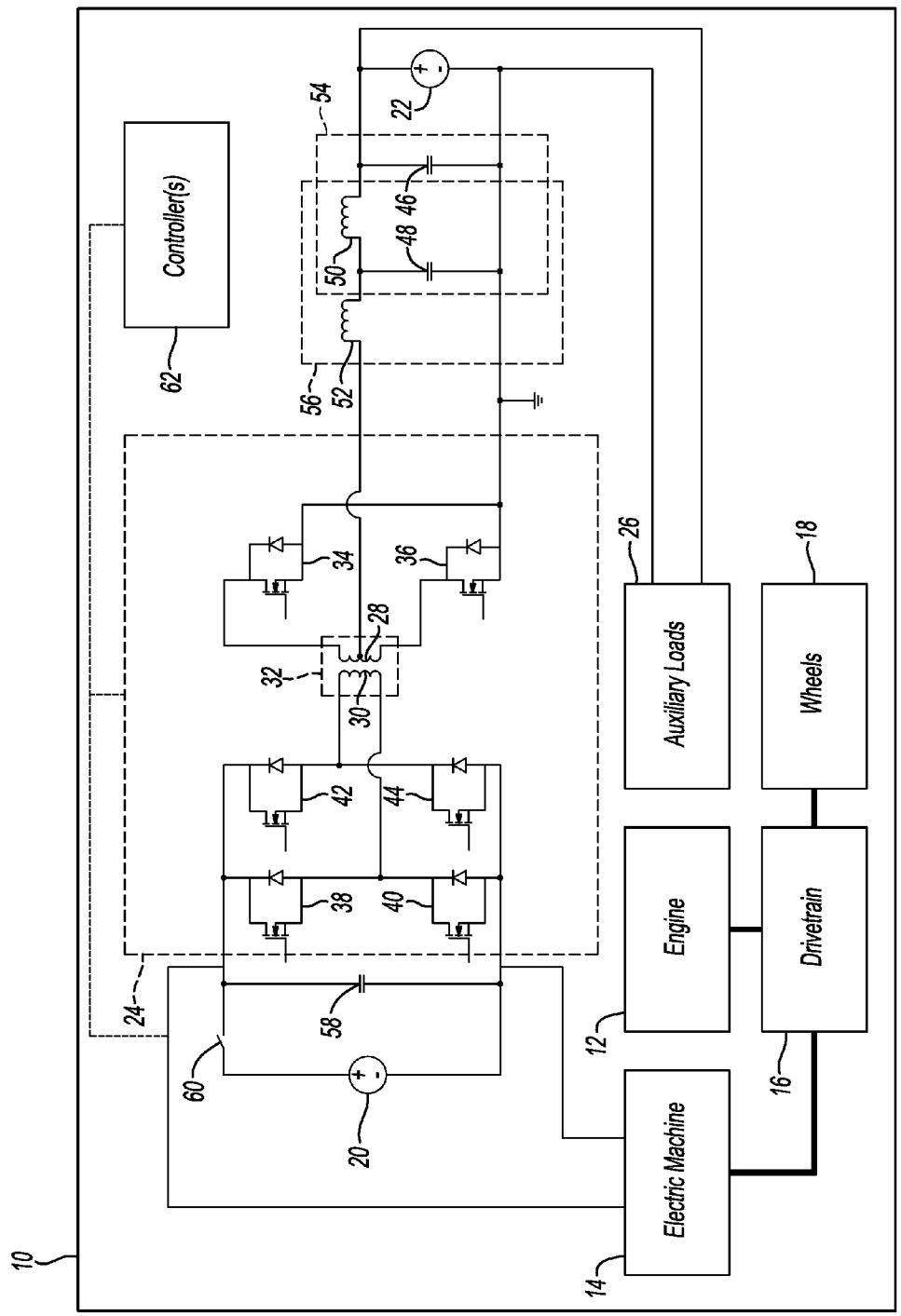

BUS PRE-CHARGE WITH VEHICLE POWER CONVERTER

TECHNICAL FIELD

This disclosure relates to the electrical infrastructure of automotive vehicles and pre-charging high voltage buses therein.

BACKGROUND

Hybrid electric vehicles may use an engine and electric machine for propulsion. The electric machine can be powered by a high voltage (e.g., 300 volt) battery. The electric machine and high voltage battery can be electrically connected via a high voltage bus. Typically, the high voltage battery and associated bus are connected through a main contactor. Prior to closing the main contactor, the high voltage bus may be at a voltage less than the high voltage battery. As such, the high voltage bus may be pre-charged by connecting it to the high voltage battery through, for example, a pre-charge contactor and resistor to increase the voltage on the high voltage bus. After the high voltage bus is pre-charged, the main contactor can be closed to directly connect the high voltage battery to the high voltage bus.

SUMMARY

A vehicle includes an electric machine to generate propulsive energy for the vehicle, a traction battery to power the electric machine, a starting, lighting and ignition (SLI) battery, and a galvanically isolated DC-DC converter connecting the batteries and having a bus capacitance in parallel therewith. The vehicle also includes a contactor to electrically connect the traction battery in parallel with the bus capacitance, and a controller. The controller, in response to a command to close the contactor, activates switches of the DC-DC converter to drive energy from the SLI battery to the bus capacitance before closing the contactor. The controller may further alter a duty cycle of the switches to control a rate of change in potential of the bus capacitance. The duty cycle may increase as the potential of the bus capacitance increases. A rate at which the duty cycle increases may be based on a specified charge profile for the bus capacitance. The rate may not be constant while the potentials of the bus capacitance and traction battery are equalizing.

A vehicle power management method includes, in response to a command to close a contactor configured to electrically connect a traction battery in parallel with a bus, activating switches of a galvanically isolated DC-DC converter connecting the traction battery and an auxiliary battery to drive energy from the auxiliary battery to the bus to substantially equalize potentials of the traction battery and bus before closing the contactor. The method may include altering a duty cycle of the switches to control a rate of change in potential of the bus. The duty cycle may increase as the potential of the bus increases. A rate at which the duty cycle increases may be based on a specified charge profile for the bus. The rate may not be constant while the potentials of the bus and traction battery are equalizing.

A vehicle power system includes a traction battery, an auxiliary battery, a galvanically isolated DC-DC converter connecting the batteries, and a bus in parallel with the DC-DC converter. The power system also includes a contactor configured to electrically connect the traction battery with the bus, and a controller. The controller, before closing the contactor, activates switches of the DC-DC converter to drive energy from the auxiliary battery to the bus. The controller may further alter a duty cycle of the switches to control a rate of change in potential of the bus. The duty cycle may increase as the potential of the bus increases. A rate at which the duty cycle increases may be based on a specified charge profile for the bus. The rate may not be constant while the potentials of the bus and fraction battery are equalizing.

BRIEF DESCRIPTION OF THE DRAWINGS

FIG. 1 is a schematic diagram of an automotive vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the FIGURES may be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

High voltage components of a vehicle power system, such as the DC-DC power converter, are often isolated (although not galvanically) from the traction battery via a set of contactors. While these contactors provide isolation, they also supply power to highly capacitive loads including the DC-DC power converter. As such, current surges should be avoided to prevent issues with the high voltage components.

Pre-charge circuitry may limit inrush current during start-up based on a resistor and contactor design. Current supplied from the high voltage battery to the pre-charge circuitry, however, may be non-uniform. As a result, the components of the pre-charge circuitry (e.g., pre-charge contactor, etc.) may be larger, heavier, or more costly than in circumstances in which the current supplied is more uniform because the components have to be able to accommodate larger swings in current magnitude with an acceptable expected life. Furthermore, the pre-charge time may depend on the resistance of the pre-charge resistor and the current supplied. That is, as the state of charge of the high voltage battery decreases, the pre-charge time may increase as the size of the pre-charge resistor does not change. Still further, the precision with which the pre-charge circuitry can perform the pre-charge function, given that is passive, may impact the wear rate of the main contactor.

Generally speaking, the DC-DC converters used in vehicles (e.g., electric vehicles) are unidirectional. It is possible, however, to modify the design of these converters (e.g., synchronous rectified DC-DC converters) to incorporate pre-charge functionality to meet start-up requirements. (A synchronous rectifier is an electronic switch that improves power-conversion efficiency by placing a low resistance conduction path across a diode rectifier.) Metaloxide-semiconductor field-effect transistors (MOSFETs) or other switches, in some examples, can be used for this purpose. The MOSFETs (bidirectional devices), with appropriate circuit design and control, can facilitate energy flow from a primary side to a secondary side of a transformer and vice versa.

With reference to FIG. 1, an automotive vehicle 10 includes an engine 12, electric machine 14, drivetrain 16, and wheels 18. The engine 12 and electric machine 14 are each mechanically connected with the drivetrain 16 (as indicated by heavy line). And, the drivetrain 16 is mechanically connected with the wheels 18 (as indicated by heavy line). As such, the engine 12 or electric machine 14 (or both) may act to propel the vehicle 10 via the drivetrain 16 and wheels 18. The engine 12 and electric machine 14, in other examples, may be serially arranged along a torque path and selectively coupled and decoupled via, for example, a clutch. Other vehicle arrangements are of course also possible.

The vehicle 10 further includes a traction battery 20, a starting, lighting, ignition (SLI) battery 22 (auxiliary battery), a galvanically isolated DC-DC power converter 24 (and related circuit components) arranged between the traction and auxiliary batteries 20, 22, and auxiliary loads 26. The traction battery 20 is arranged to provide power to or receive power from the electric machine 14 depending on whether the electric machine is motoring or generating. Likewise, the auxiliary battery 22 is arranged to provide power to the auxiliary loads 26.

The power converter 24, in this example, includes coils 28, 30 forming a transformer 32, and switches (e.g., metal-oxide-semiconductor field-affect transistors, etc.) 34, 36, 38, 40, 42, 44. The switches 34, 36 are arranged to circulate current between the auxiliary battery 22 and coil 28. The switches 38, 40, 42, 44 are arranged to circulate current between the traction battery 20 and coil 30. Other converter arrangements are also possible. For example, a non-center tapped secondary side with four switches (similar to the primary side) can be used, etc.

The related circuit components may include capacitors 46, 48 and inductors 50, 52. The capacitors 46, 48 and inductor 50, in this example, are arranged to form a pi filter 54 electrically connected between the auxiliary battery 22 and power converter 24. And, the capacitor 48 and inductors 50, 52 are arranged to form a T filter 56 electrically connected between the auxiliary battery 22 and power converter 24. The related circuit components may further include a bus capacitance 58 in parallel with the traction battery 20, and a main contactor 60 configured to electrically connect the traction battery 20 with the power converter 24 and bus capacitance 58. Unlike conventional contactor arrangements, however, the main contactor 60 does not have associated therewith pre-charge circuitry. Rather, current from the auxiliary battery 22, as explained in more detail below, may be used to substantially equalize the potentials across each of the traction battery 20 and bus capacitance 58 prior to closing the main contactor 60.

The vehicle 10 further includes one or more controllers 62 programmed to control the power converter 24 and main contactor 60 (as indicated by dashed line). That is, for example, in response to a request to close the main contactor 60, the controller 62 may activate the switches 34 through 44 to drive current from the auxiliary battery 22, across the transformer 32, and to the bus to increase the potential across the bus capacitance 58 to an amount roughly equal to the potential across the traction battery 20 prior to closing the main contactor 60 to avoid welding the main contactor 60.

For example assuming the main contactor 60 is open and the controller 62 has received a command to close the main contactor 60, the controller 62 may close the switch 34 and open the switch 36. Current will flow from the positive terminal of the auxiliary battery 22 to the center tapped portion of the coil 28, through the switch 34, and return to the negative terminal of the auxiliary battery 22. This will cause a current to flow through the coil 30 in a direction from the top of the page toward the bottom of the page (assuming the dots associated with the coils 28, 30 are on opposite sides). Given the diode arrangement associated with the switches, the current from the coil 30 will flow through the diode associated with the switch 38, the capacitance 58, the diode associated with the switch 44, and return to the coil 30. After a period of time, the controller 62 may open the switch 34, and thereafter close the switch 36 for a same period of time that the switch 34 was closed. Current will flow from the positive terminal of the auxiliary battery 22 to the center tapped portion of the coil 28, through the switch 36, and return to the negative terminal of the auxiliary battery 22. This will cause a current to flow through the coil 30 in a direction from the bottom of the page toward the top of the page. The current from the coil 30 will flow through the diode associated with the switch 42, the capacitance 58, the diode associated with the switch 40, and return to the coil 30 (and so on). While the period of time between the turning on of the switch 34 and the turning off of the switch 36 may remain generally constant, the amount of time that each of the switches 34, 36 is on may vary as the bus acquires charge. For example, the switches 34, 36 may initially be alternately on for 10% of the period of time, and as charge is acquired, the switches 34, 36 may alternately be on for 50% of the period of time.

Control over the duty cycle associated with the switches 34, 36, can provide associated control over the behavior of the change in bus capacitance 58, prior to closing the main contactor 60, not possible in certain conventional systems. The controller 62, for example, may manipulate the duty cycle to achieve a specified charge profile for the bus: the duty cycle may increase as the potential of the bus capacitance 58 increases; the rate (which may be constant or varying) at which the duty cycle changes can be controlled according to the specified charge profile, etc. The rate at which the duty cycle increases controls the rate that energy is transferred to the bus capacitance 58, thus providing a controlled method of pre-charging the high voltage bus.

The arrangements contemplated herein may, in certain circumstances, offer several advantages including improved efficiency and packaging, and reduced part count, cost, heat dissipation, and noise, vibration and harshness (the closing of a contactor can sometimes result in an audible "click").

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to generate propulsive energy for the vehicle;
   a traction battery configured to power the electric machine;
   a starting, lighting and ignition (SLI) battery;
   a galvanically isolated DC-DC converter connecting the batteries and having a bus capacitance in parallel therewith;
   a contactor configured to electrically connect the traction battery in parallel with the bus capacitance; and
   a controller programmed to, in response to a command to close the contactor,
      activate switches of the DC-DC converter to drive energy from the SLI battery to the bus capacitance before closing the contactor, and
      alter a duty cycle of the switches, that increases as a potential of the bus capacitance increases, to control a rate of change in the potential.

2. The vehicle of claim 1, wherein a rate at which the duty cycle increases is based on a specified charge profile for the bus capacitance.

3. The vehicle of claim 2, wherein the rate is not constant while potentials of the bus capacitance and traction battery are equalizing.

4. A vehicle power management method comprising:
   in response to a command to close a contactor configured to electrically connect a traction battery in parallel with a bus,
      activating switches of a galvanically isolated DC-DC converter connecting the traction battery and an auxiliary battery to drive energy from the auxiliary battery to the bus to substantially equalize potentials of the traction battery and bus before closing the contactor, and
      altering a duty cycle of the switches, that increases as the potential of the bus increases, to control a rate of change in the potential of the bus.

5. The method of claim 4, wherein a rate at which the duty cycle increases is based on a specified charge profile for the bus.

6. The method of claim 5, wherein the rate is not constant while the potentials of the bus and traction battery are equalizing.

7. A vehicle power system comprising:
   a galvanically isolated DC-DC converter including switches, and connecting traction and auxiliary batteries;
   a bus in parallel with the DC-DC converter; and
   a controller programmed to, before closing a contactor configured to electrically connect the traction battery and bus, alter a duty cycle of the switches to control a rate of change in potential of the bus, wherein the duty cycle increases as the potential increases.

8. The system of claim 7, wherein a rate at which the duty cycle increases is based on a specified charge profile for the bus.

9. The system of claim 8, wherein the rate is not constant while the potentials of the bus and traction battery are equalizing.

* * * * *